US008264591B2

(12) United States Patent
Yeo et al.

(10) Patent No.: US 8,264,591 B2
(45) Date of Patent: Sep. 11, 2012

(54) METHOD AND SYSTEM FOR GENERATING FOCUS SIGNAL

(75) Inventors: Yunn-En Yeo, Singapore (SG); Hiok-Nam Tay, Singapore (SG)

(73) Assignee: CANDELA Microsystems (S) Pte. Ltd., Singapore (SG)

( * ) Notice: Subject to any disclaimer, the term of this patent is extended or adjusted under 35 U.S.C. 154(b) by 1065 days.

(21) Appl. No.: 12/082,577

(22) Filed: Apr. 11, 2008

(65) Prior Publication Data

US 2009/0102963 A1 Apr. 23, 2009

Related U.S. Application Data

(60) Provisional application No. 61/000,053, filed on Oct. 22, 2007.

(51) Int. Cl.
G03B 13/00 (2006.01)
H04N 5/232 (2006.01)
G06K 9/40 (2006.01)

(52) U.S. Cl. .......................... 348/345; 348/349; 382/255

(58) Field of Classification Search ........................ None
See application file for complete search history.

(56) References Cited

U.S. PATENT DOCUMENTS

| 5,396,336 | A | | 3/1995 | Yoshii et al. | |
|---|---|---|---|---|---|
| 5,729,290 | A | | 3/1998 | Tokumitsu et al. | |
| 5,875,040 | A | * | 2/1999 | Matraszek et al. | 358/453 |
| 6,094,508 | A | * | 7/2000 | Acharya et al. | 382/199 |
| 6,337,925 | B1 | * | 1/2002 | Cohen et al. | 382/199 |
| 7,406,208 | B2 | * | 7/2008 | Chiang | 382/266 |
| 7,586,520 | B2 | * | 9/2009 | Igarashi | 348/208.6 |
| 7,590,288 | B1 | * | 9/2009 | Alvarez et al. | 382/199 |
| 7,668,389 | B2 | * | 2/2010 | Kitamura et al. | 382/255 |
| 7,720,302 | B2 | * | 5/2010 | Aoyama | 382/255 |
| 7,899,264 | B2 | | 3/2011 | Stewart | |
| 2002/0114015 | A1 | | 8/2002 | Fujii | |
| 2003/0053161 | A1 | | 3/2003 | Li | |
| 2003/0099044 | A1 | | 5/2003 | Fujii | |
| 2003/0158710 | A1 | | 8/2003 | Bowley, Jr. et al. | |
| 2004/0267506 | A1 | | 12/2004 | Bowley, Jr. et al. | |
| 2005/0243351 | A1 | | 11/2005 | Aoyama | |
| 2005/0244077 | A1 | * | 11/2005 | Kitamura et al. | 382/261 |
| 2005/0248655 | A1 | | 11/2005 | Kitamura | |
| 2005/0249429 | A1 | * | 11/2005 | Kitamura | 382/255 |
| 2006/0078217 | A1 | * | 4/2006 | Poon et al. | 382/255 |
| 2006/0078218 | A1 | | 4/2006 | Igarashi | |

(Continued)

OTHER PUBLICATIONS

PCT/IB2008/003822, International Search Report & Written Opinion.

*Primary Examiner* — Justin P Misleh
(74) *Attorney, Agent, or Firm* — Irell & Manella LLP; Ben Yorks

(57) ABSTRACT

An auto focus image system that includes an image sensor coupled to a controller. The image sensor captures an image that has at least one edge with a width. The controller generates a focus signal that is a function of the edge width. A lens receives the focus signal and adjust a focus. The edge width can be determined by various techniques including the use of gradients. A histogram of edge widths can be used to determine whether a particular image is focused or unfocused. A histogram with a large population of thin edge widths is indicative of a focused image.

22 Claims, 19 Drawing Sheets

U.S. PATENT DOCUMENTS

| | | |
|---|---|---|
| 2006/0188170 A1* | 8/2006 | Kanda et al. ............ 382/255 |
| 2006/0204120 A1 | 9/2006 | Poon et al. |
| 2007/0279696 A1 | 12/2007 | Matsuzaka |
| 2008/0036900 A1 | 2/2008 | Nakajima et al. |
| 2008/0151309 A1 | 6/2008 | Mizobe |
| 2008/0267508 A1* | 10/2008 | Steffensen ............ 382/199 |

* cited by examiner

|    | C1 | C2 | C3 | C4 | C5 | C6 |
|----|----|----|----|----|----|----|
| R1 | 10 V | 10 V | 10 V | 2 V | 0 V | 0 V |
| R2 | 3 V | 10 V | 10 V | 9 V | 1 V | 0 V |
| R3 | 1 V | 3 V | 8 V | 9 V | 7 V | 1 V |
| R4 | 0 V | 1 V | 3 V | 7 V | 8 V | 7 V |
| R5 | 0 V | 0 V | 1 V | 3 V |   |   |
| R6 | 0 V | 0 V | 0 V | 1 V | 3 V |   |

FIG. 8e

|    | C1 | C2 | C3 | C4 | C5 | C6 |
|----|----|----|----|----|----|----|
| R1 |    |    |    |    |    |    |
| R2 |    |    |    |    |    |    |
| R3 |    |    |    |    |    |    |
| R4 |    |    |    |    |    |    |
| R5 |    |    |    |    | 12 H | 12 H |
| R6 |    |    |    |    |    | 8 H |

FIG. 8f

METHOD AND SYSTEM FOR GENERATING FOCUS SIGNAL

REFERENCE TO CROSS-RELATED APPLICATIONS

This application claims priority to Application No. 61/000,053 filed on Oct. 22, 2007.

BACKGROUND OF THE INVENTION

1. Field of the Invention

The subject matter disclosed generally relates to auto-focusing electronically captured images.

2. Background Information

Photographic equipment such as digital cameras and digital camcorders may contain electronic image sensors that capture light for processing into still or video images, respectively. Electronic image sensors typically contain millions of light capturing elements such as photodiodes.

Many image capturing devices such as cameras include an auto-focusing system. The process of auto-focusing includes the steps of capturing an image, processing the image to determine whether it is in focus, and if not, generating a feedback signal that is used to vary the focus of the device lens. There are two primary auto-focusing techniques. The first technique involves contrast measurement, the other technique looks at phase differences between pairs of images. In the contrast method the intensity difference between adjacent pixels is analyzed and the focus is adjusted until a maximum contrast is detected. Although acceptable for still pictures the contrast technique is not suitable for motion video.

The phase difference method includes splitting an incoming image into two images that are captured by separate image sensors. The two images are compared to determine a phase difference. The focus is adjusted until the two images match. The phase difference method requires additional parts such as beam splitters and an extra image sensor. Additionally, the phase difference approach analyzes a relatively small band of fixed detection points. Having a small group of detection points is prone to error because noise may be superimposed onto one or more points. This technique is also ineffective if the detection points do not coincide with an image edge. Finally, because the phase difference method splits the light the amount of light that impinges on a light sensor is cut in half. This can be problematic in dim settings where the image light intensity is already low.

BRIEF SUMMARY OF THE INVENTION

An auto focus image system that includes an image sensor coupled to a controller. The image sensor captures an image that has at least one edge with a width. The controller generates a focus signal that is a function of the edge width.

BRIEF DESCRIPTION OF THE DRAWINGS

FIGS. 8a and b are illustrations showing the gradients of a plurality of pixels in a near 45 degree relationship to vertical and horizontal edges;
FIGS. 8c and d are illustration showing the broken identification of edges from the array of pixels shown in FIGS. 8a and 8b;
FIG. 8e is an illustration showing the identification of vertical edges utilizing gradient hysterisis;
FIG. 8f is an illustration showing the identification of horizontal edges utilizing gradient hysterisis.

DETAILED DESCRIPTION

Disclosed is an auto focus image system that includes an image sensor coupled to a controller. The image sensor captures an image that has at least one edge with a width. The controller generates a focus signal that is a function of the edge width. A lens receives the focus signal and adjust a focus. The edge width can be determined by various techniques including the use of gradients. A histogram of edge widths can be used to determine whether a particular image is focused or unfocused. A histogram with a large population of thin edge widths is indicative of a focused image.

Figure 1:
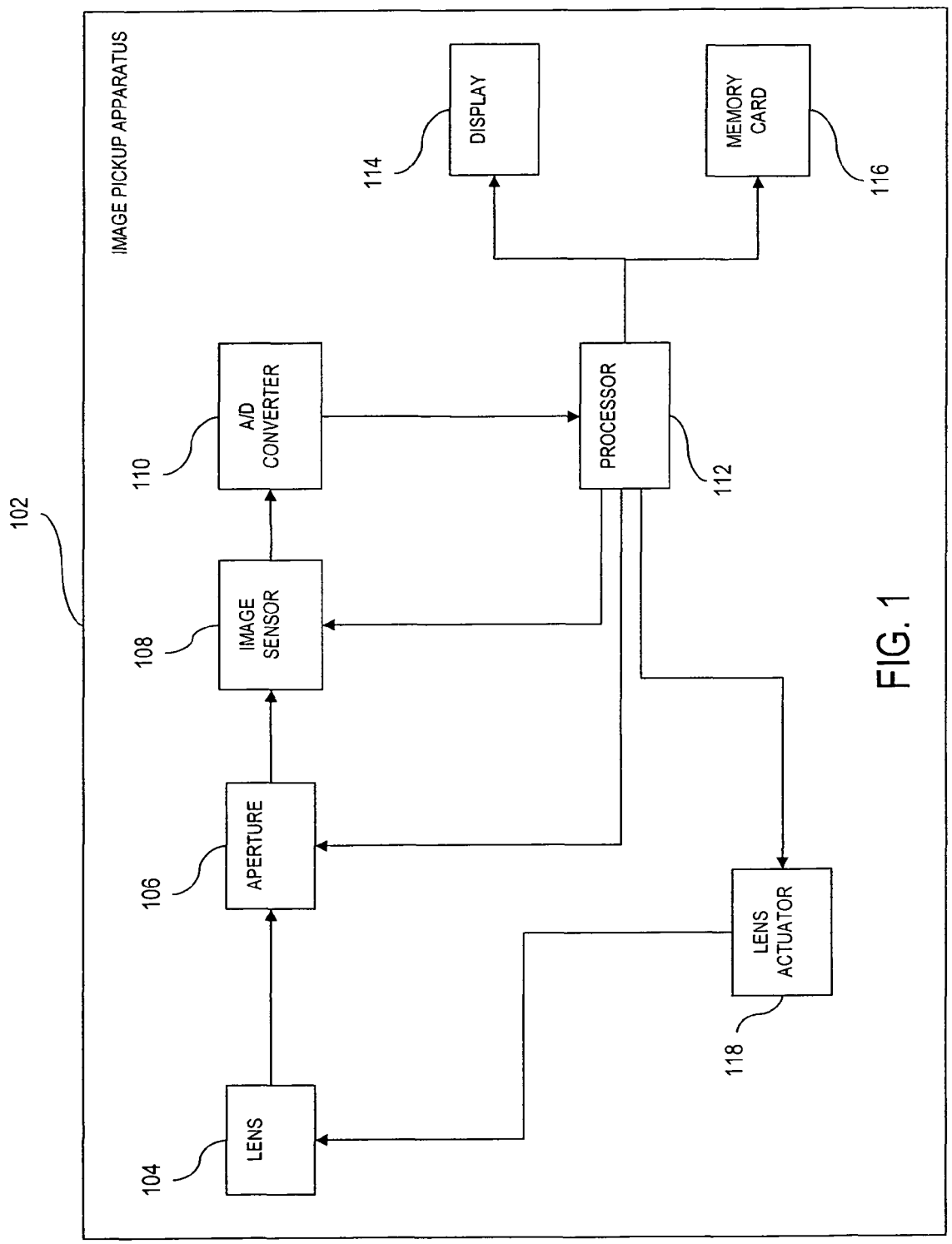
FIG. 1 is an illustration of an auto focus image system.

Referring to the drawings more particularly by reference numbers, FIG. 1 shows an embodiment of an auto-focus image system 102. The system 102 may be part of a digital still camera, but it is to be understood that the system can be embodied in any device that requires controlled focusing of an image. The system 102 may include a lens 104, an aperture 106, an image sensor 108, an A/D converter 110, a processor 112, a display 114, a memory card 116 and a lens actuator 118. Light from a scene enters through the lens 104. The aperture 106 controls the amount of light entering into the image sensor 108. The image sensor 108 generates an analog signal that is converted to a digital signal by the A/D Converter 110. The digital signal is then sent to the processor 112 that performs various processes, such as interpolation. The processor 112 generates a focus control signal that is sent to the lens actuator 118 to control both the aperture 106 and the lens 104. A focused image is ultimately provided to the display 114 and/or stored in the memory card 116. The algorithm(s) used to focus is performed by the processor 112. The image sensor 108, A/D Converter 110, and processor 112 may all reside on the same integrated circuit chip.

Figure 2:
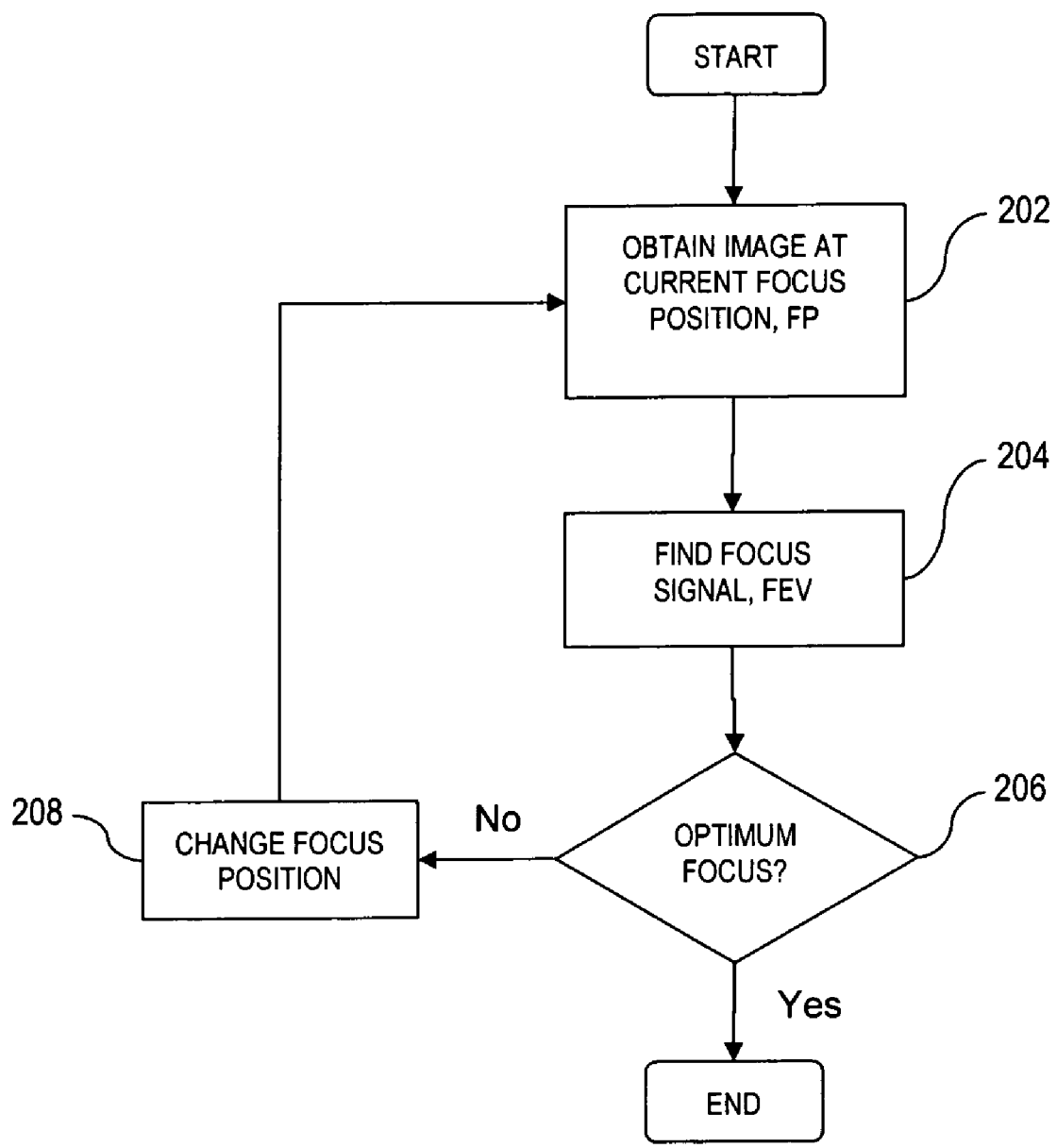
FIG. 2 is a flowchart showing an auto-focus process.

FIG. 2 shows a flowchart of a process to auto-focus an image. An image is captured at the current focus position in block 202. In block 204 the image is processed to determine a focus signal, FEV. In decision block 206 the processor determines whether the image is focused based on the focus signal, FEV. If the image is deemed to be blurred, the process proceeds to block 208, where a different focus position is selected and process blocks 202, 204 and 206 are repeated. If the image is focused the process ends.

Figure 3:
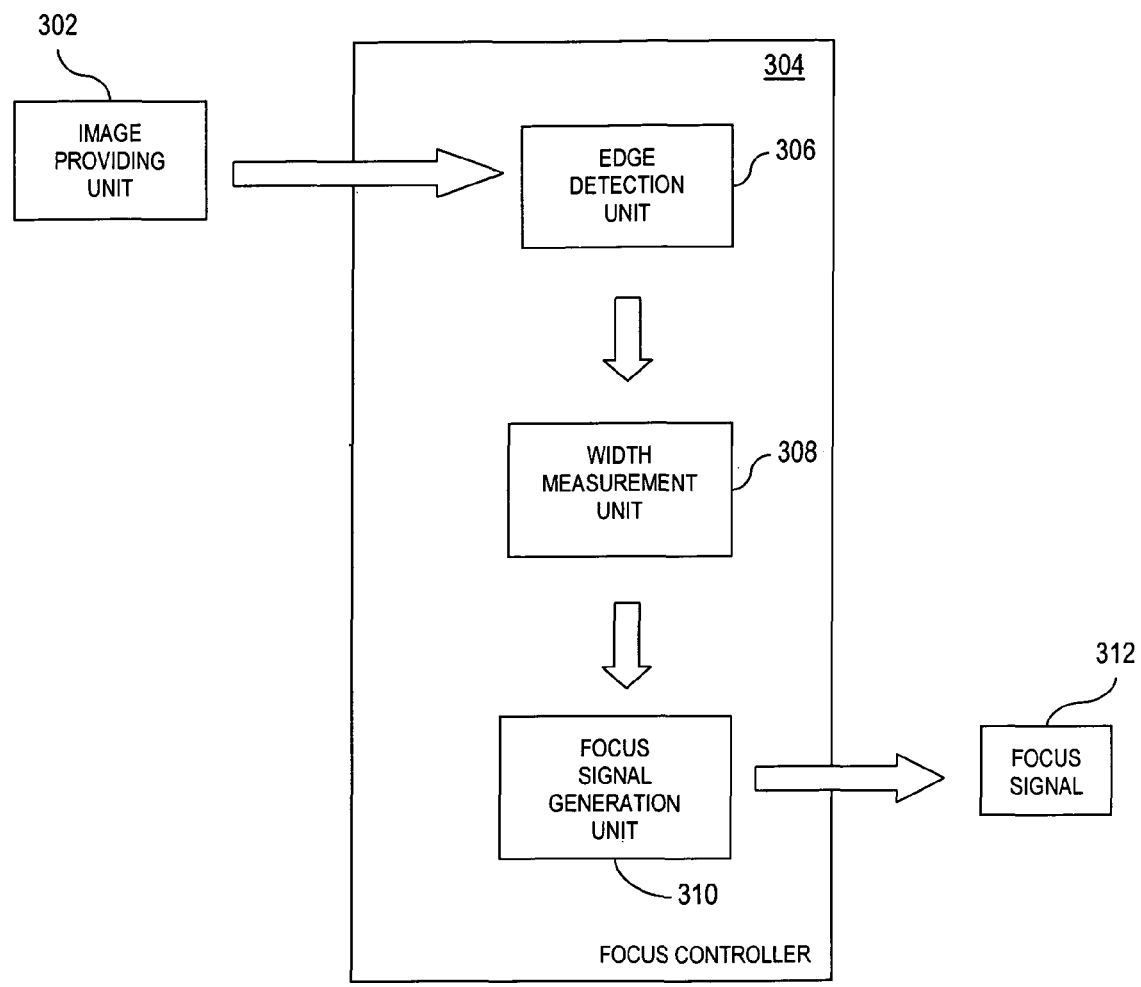
FIG. 3 is a schematic showing a controller of the system.

FIG. 3 shows an image providing unit 302 connected to an auto-focus controller 304. The unit 302 provides images to the controller 304. The controller 304 can be implemented as a part of an electronic device, for example as a processing unit in a camera or a similar device. An image providing unit 302 can be a digital still camera but is not limited to such an embodiment. The unit 302 can be a scanner, a digital camcorder, a webcam or any device that can provide digital images as well as allow adjustment to the focal distance of the image to the lens. The unit 302 can also be a memory card, a hard-disk with digital images, or any device that can provide the controller 304 with digital images with varying degrees of focal distances.

The focus controller 304 may include an edge detection unit 306, a width measurement unit 308 and a focus signal generation unit 310. The edge detection unit 306 detects the presence of edges from data in the digital images provided by the image providing unit 302. The detected edges are then sent to the width measurement unit 308, where the width of the edges is measured and calculated. The calculated edge widths are provided to the focus signal generation unit 310, where the sharpness of the image is measured based on the widths of the edges. The sharpness of the image is indicated by a focus signal 312 generated by the controller 304.

Figure 4:
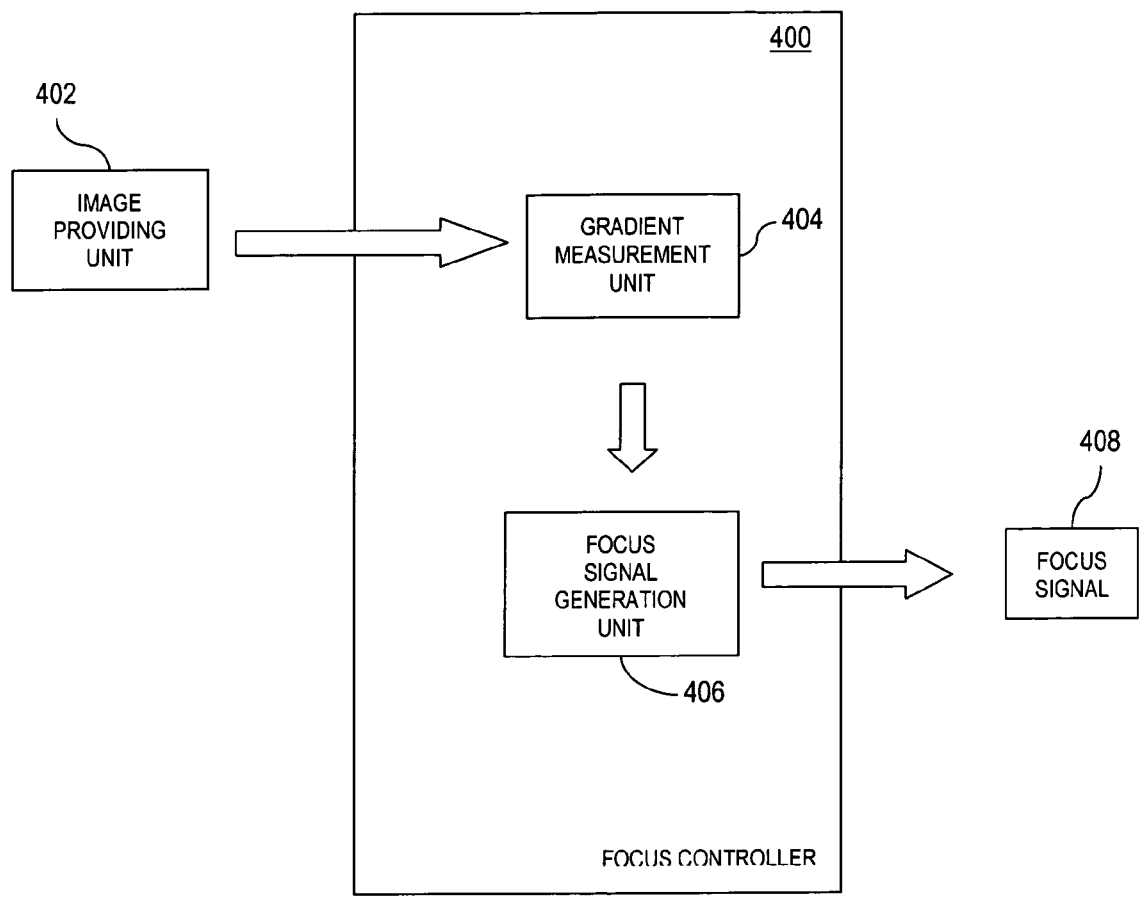
FIG. 4 is a schematic of another embodiment of the controller.

FIG. 4 shows another embodiment of a focus controller 400 connected to an image providing unit 402. The controller 400 includes a gradient measurement unit 404 and a focus signal generation unit 406. The gradient measurement unit 404 detects the presence of edges from data in the digital images provided by the image providing unit 402. The detected edges are then sent to the focus signal generation unit 406 that generates a focus signal 408 that is indicative of the image sharpness.

Figure 5:
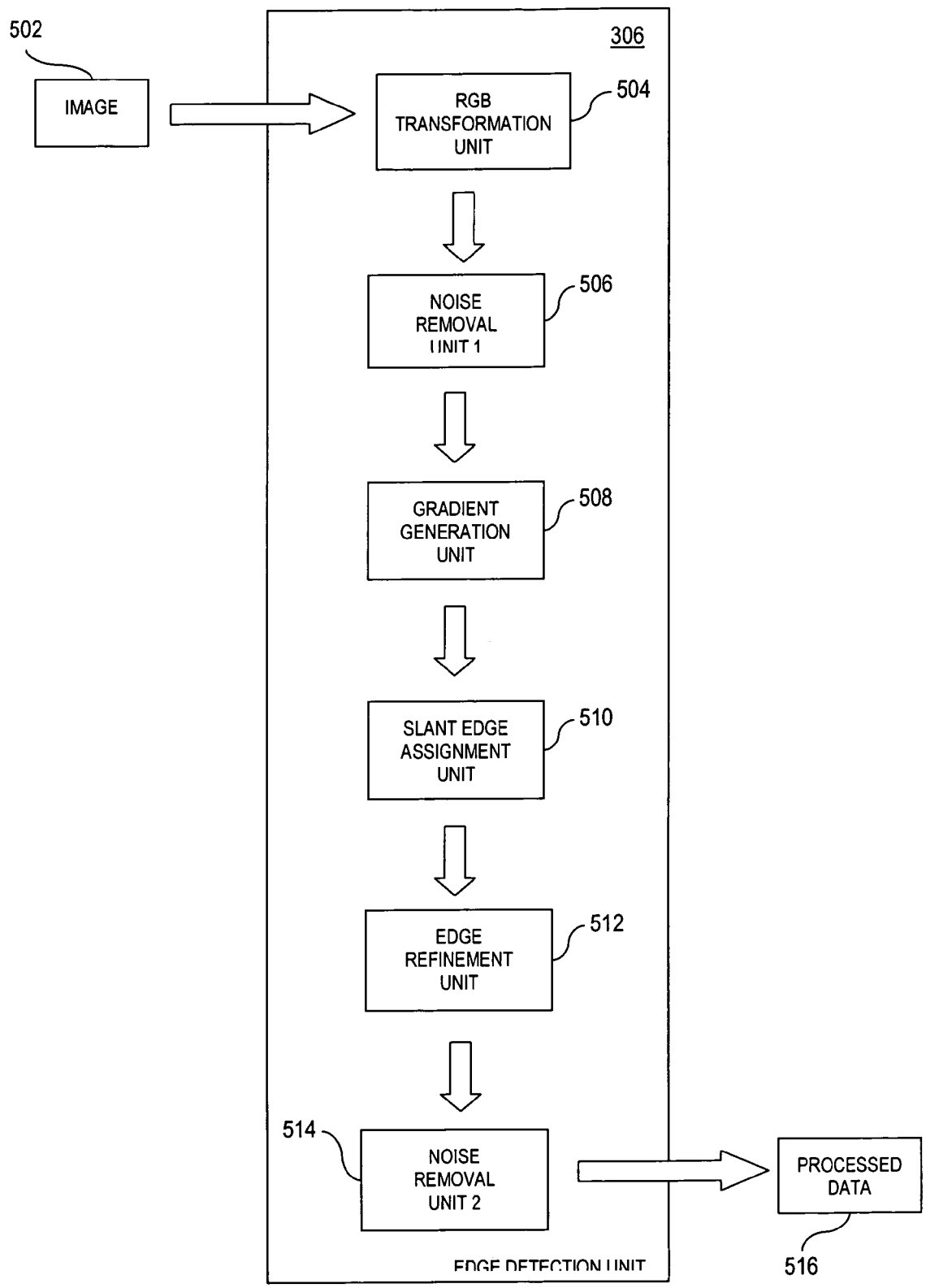
FIG. 5 is a schematic of another embodiment of the controller.

FIG. 5 shows an embodiment of an edge detection unit 306 that receives an image 502. The edge detection unit 306 includes an RGB transformation unit 504 that transforms the image such that the three signals of an image, red, green and blue are converted to a single signal. This signal can be generated by transforming the image to a grayscale image. Several techniques can be utilized to transform an image to a grayscale. RGB values can be used to calculate a luminance or chrominance value or a specific ratio of RGB values can be taken to form the grayscale image. For example, the luminance value can be calculated with the following equation:

$$Y = 0.2126*R + 0.7152*G + 0.0722*B, \text{ where}$$
$$Y = \text{luminance value}.$$

Figure 6:
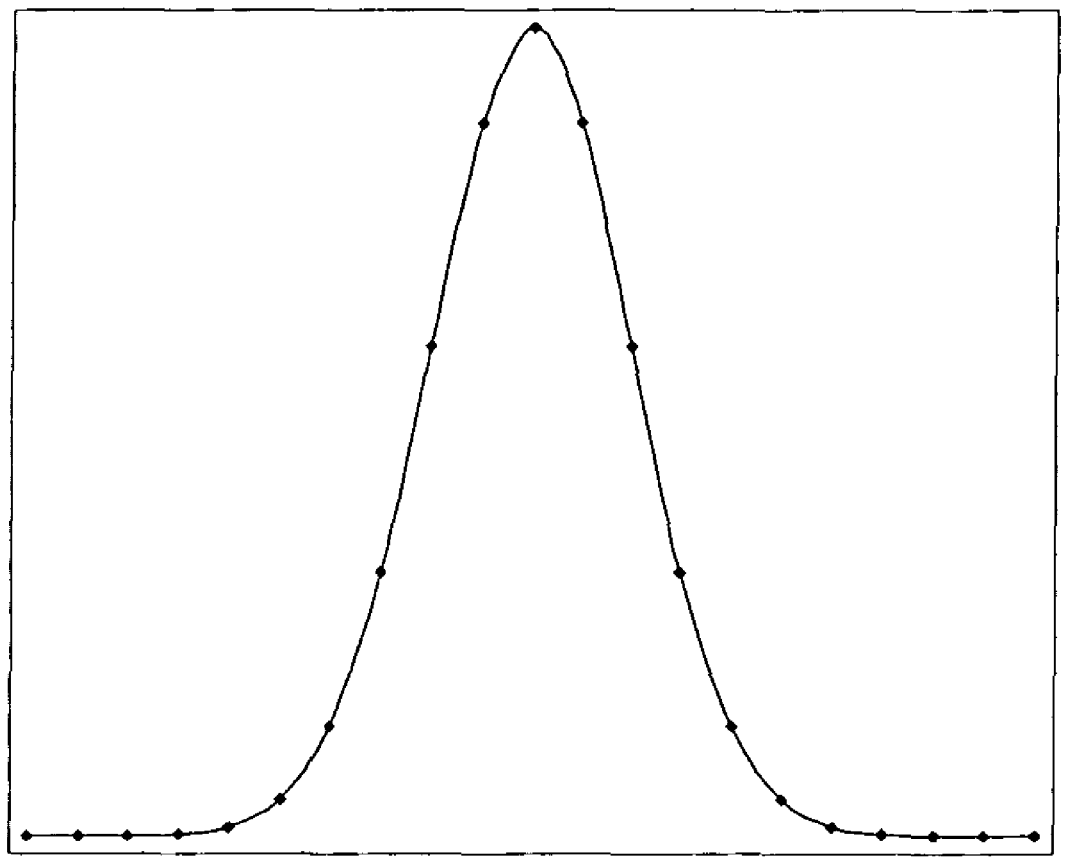
FIG. 6 is a graph showing the impulse response of a Gaussian filter.

The signal from the grayscale image is then processed by a noise removal unit 506, where a prior noise removal is performed on the image. The noise removal unit 506 can be a low-pass filter or a Gaussian filter. FIG. 6 illustrates the impulse response of a Gaussian filter. The Gaussian filter smoothes out pixel signal values among surrounding pixels.

Referring to FIG. 5, the gradient of the processed image is then calculated with a gradient generation unit 508. There are various methods available to calculate the gradient, including Laplacian, and Sobel. In one embodiment, the edge detection unit 306 detects vertical and horizontal edges separately. Hence the gradient across the columns and the rows are calculated to detect vertical and horizontal edges respectively, using a Sobel-X operator and a Sobel-Y operator, respectively. Sobel X-operator at pixel location [k, q] where k is row number and q is column number, is given by the equation $Sx[k,q]=G[k,q+1]-G[k,q-1]$. Sobel Y- operator at the same location is given by the equation $Sy[k,q]=G[k+1,q]-G[k-1,q]$.

Figures 7A, 7B, 7C, 7D:
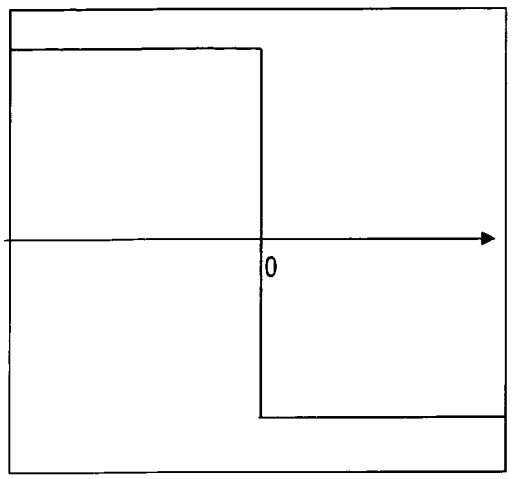
FIG. 7a is a graph showing a threshold filter.
FIG. 7b is an illustration showing horizontal and vertical gradients of a plurality of image pixels.
FIG. 7c is an illustration showing horizontal edges.
FIG. 7d is an illustration showing vertical edges.

Once the gradient is calculated, a filter assigns slant edges to either horizontal edges or vertical edges in a slant edges assignment unit 510. The filter can be in the form of a simple threshold filter or a hysteretic filter. FIG. 7a shows a threshold filter. FIG. 7b shows a plurality of pixels from a portion of an image with the horizontal and vertical gradients for each pixel. The horizontal gradient of each pixel is shown at the top left hand corner of each square, with each square denoting a pixel, while the vertical gradient is shown at the bottom right corner. For the threshold filter shown in FIG. 7a, an edge is tagged as a vertical edge if its horizontal gradient is greater than its vertical gradient and vice versa. FIG. 7c and FIG. 7d show the pixels denoted as horizontal edges H and vertical edges V, respectively, from the gradient shown in FIG. 7b.

Figures 8A, 8B, 8C, 8D:
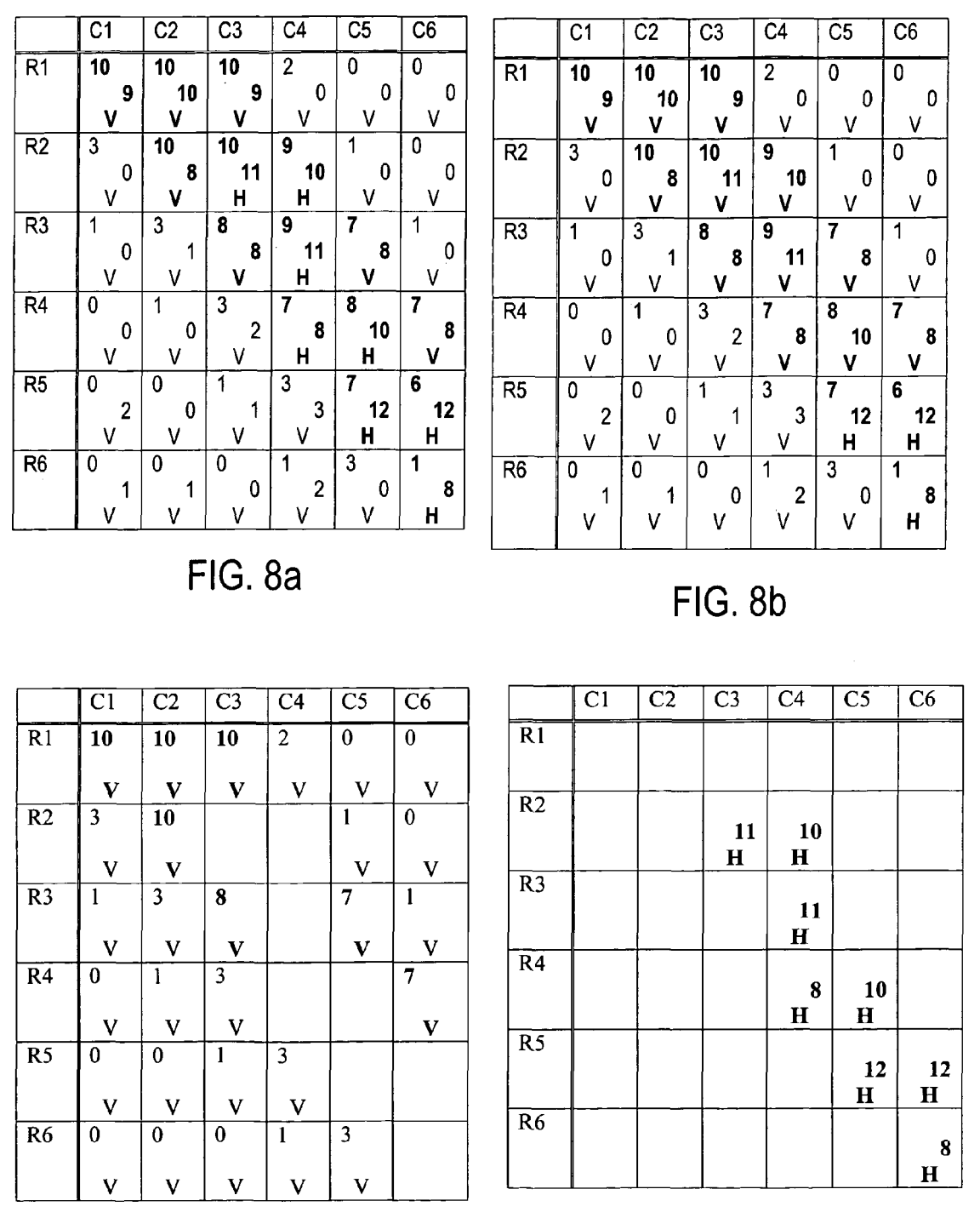

Another technique for assigning edges is to use a hysteresis. Assume the pixels are scanned down the columns from top to bottom, and sequentially column-by-column from left to right. (An alternative scanning scheme may scan horizontally along the row, and sequentially row-by-row from top to bottom.) Assigning a pixel to a vertical or a horizontal edge is performed on pixels that are already scanned. For a current pixel, three nearest pixels already scanned are at top, left, and top left. Among these three pixels, the one that has the greatest gradient, regardless of vertical or horizontal, is selected as a reference pixel. The reference pixel's chosen edge direction is the current pixel's preferred direction. A positive gradient hysteresis value is given. If the preferred direction is horizontal, the current pixel is labeled horizontal if the horizontal gradient is not more than the sum of the vertical gradient and the gradient hysteresis; otherwise the pixel is labeled vertical. If the preferred direction is vertical, the current pixel is labeled vertical if the vertical gradient is not more than the sum of the horizontal gradient and the gradient hysteresis; otherwise the pixel is labeled horizontal. FIGS. 8e and 8f show a vertical edge gradient map and a horizontal edge gradient map, respectively, using a hysteresis of 2. An advantage of the hysteretic filter method over the threshold filter method is a less likelihood of edge fragmentation which results from random assignment of pixels in a near-45-degree edge to horizontal and vertical edges due to nearly identical vertical and horizontal gradient magnitudes, such as the situation shown in FIG. 8a. This may result in an edge broken up into several narrow edges as shown in FIGS. 8c and 8d. This is to be compared with the results shown in FIGS. 8e and 8f which do not exhibit such problems.

Referring again to FIG. 5, an edge refinement unit 512 refines the edges provided by the slant edge assignment unit 510. Such refinement is necessary when there are many edges crowded together such that a plurality of edges may overlap one another. Edge refinement ensures that only the steepest edge among the plurality of overlapping edges remains. After refinement, the processed image is provided to noise removal unit 514 that removes noise. The noise removal unit 514 may remove edges with gradient levels that fall outside a predetermined window. The purpose of the noise removal unit 514 is to ensure that spurious edges caused by noise in bright and dark areas are eliminated. A processed data signal 516 is provided by unit 514.

Figure 9:
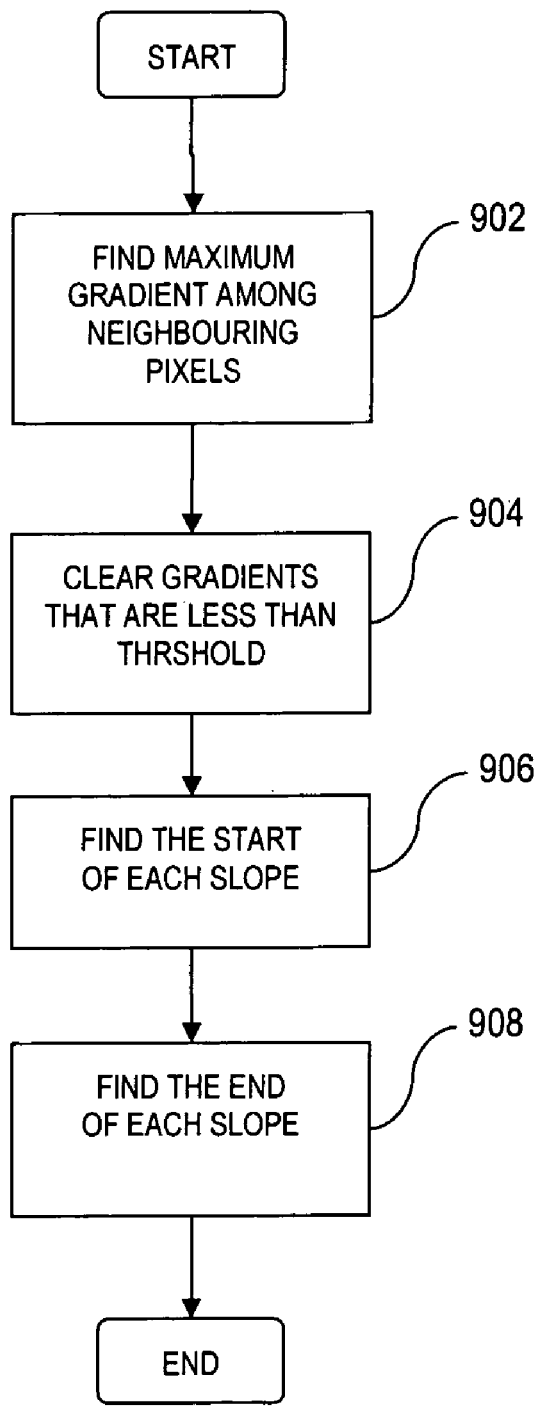
FIG. 9 is a flowchart showing a process that determines an edge width.

FIG. 9 shows a process performed by the edge refinement unit 512. The maximum gradient among pixels in the same edge is initial found in process block 902. Pixels are in the same edge if they are contiguous, have non-zero gradients, and have the same gradient polarity. Next, gradients with magnitudes that are less than a predetermined threshold are eliminated in block 904. The remaining gradients are scanned to pick out the start and the end of the slope, in blocks 906 and 908 respectively.

Figure 10A:
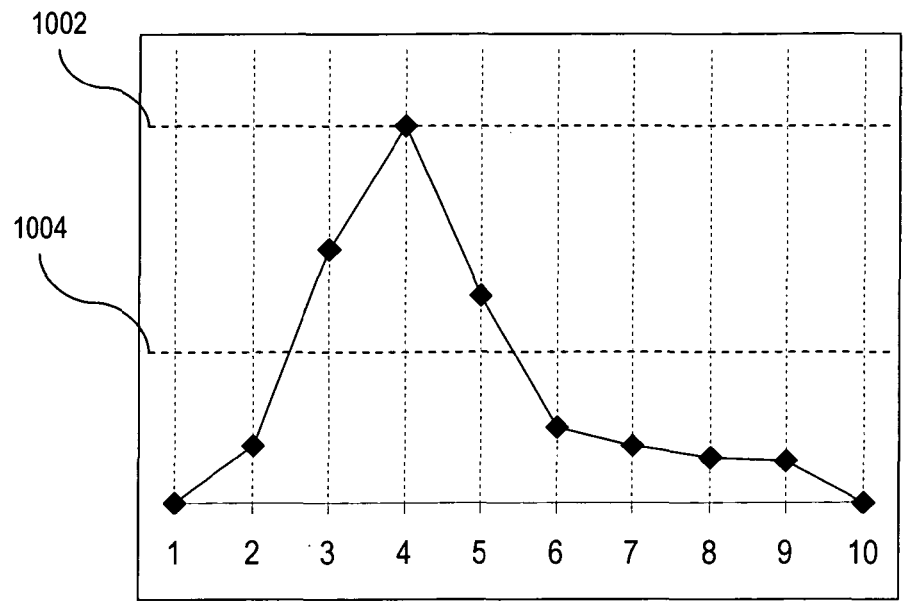
FIG. 10a is an illustration showing the pixels of a selected edge.
Figure 10B:
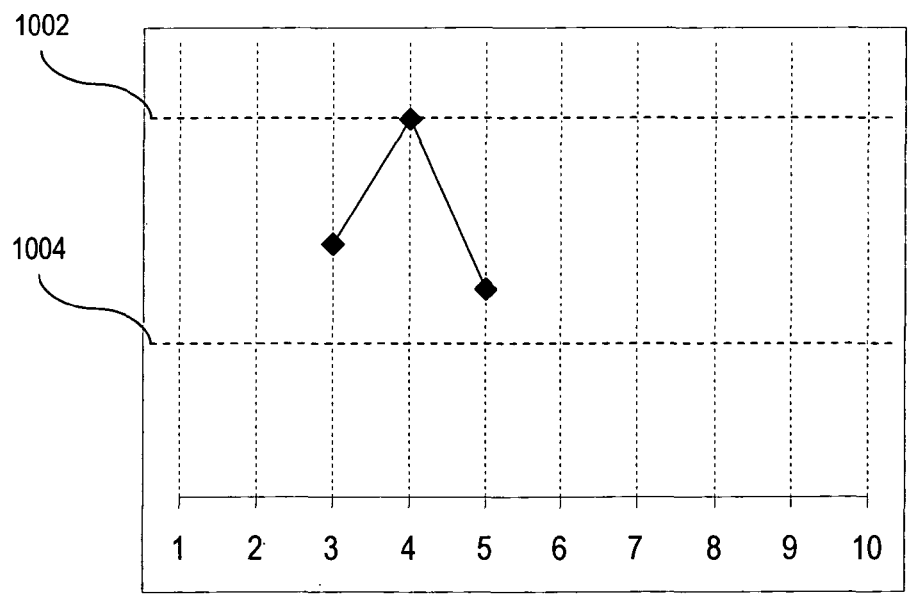
FIG. 10b is an illustration showing the pixels having gradients that exceed a threshold.

FIG. 10*a* shows a trend of the gradient values of an edge which starts at position 2 and ends at position 9 before edge refinement is performed. The peak at position 4 of the trend represents the location where the edge is the most prominent. Edge refinement is done when there may be crowding of edges causing a superposition of gradient signals. Hence only significant gradient values adjacent the peak of the gradient trend are taken into account when counting the width of the edge. The threshold 1004 is calculated as a predetermined fraction of the peak gradient value 1002 of the edge; hence pixels with gradient values less than the threshold 1004 are removed, leaving in this example only three pixels with gradient values above the threshold 1004. Therefore the width of this particular edge is 3 pixels wide. The start of the slope is revised to location 3, and the end to location 5.

The noise removal unit 514 shown in FIG. 5, inspects each edge and decides if the gradient magnitude on the edge is too low and if so discards the edge. This has the benefit of removing spurious edges in a dim region due to noise, or in a bright region due to a minor change in reflectivity of the scene that does not represent true edges. One embodiment of noise removal unit 514 is to take the difference of the luminance signal (or in general the output signal of RGB transformation unit 504) at the start and end positions of the edge. The magnitudes of the positions provided by edge refinement unit 512 and described in blocks 906 and 908 of the flowchart shown in FIG. 9, are compared with a predetermined fraction of the mean of signal at the same start and end positions (otherwise referred to as the edge rejection threshold). If the difference is lesser, then the edge is rejected as spurious. In another embodiment of the noise removal unit 514, the maximum gradient magnitude within the edge is compared with a predetermined fraction of the mean of luminance signal (or in general the output signal of RGB transformation unit 504) at the start and end positions of the edge and reject the edge as spurious if the maximum gradient magnitude is lesser.

Figure 10C:
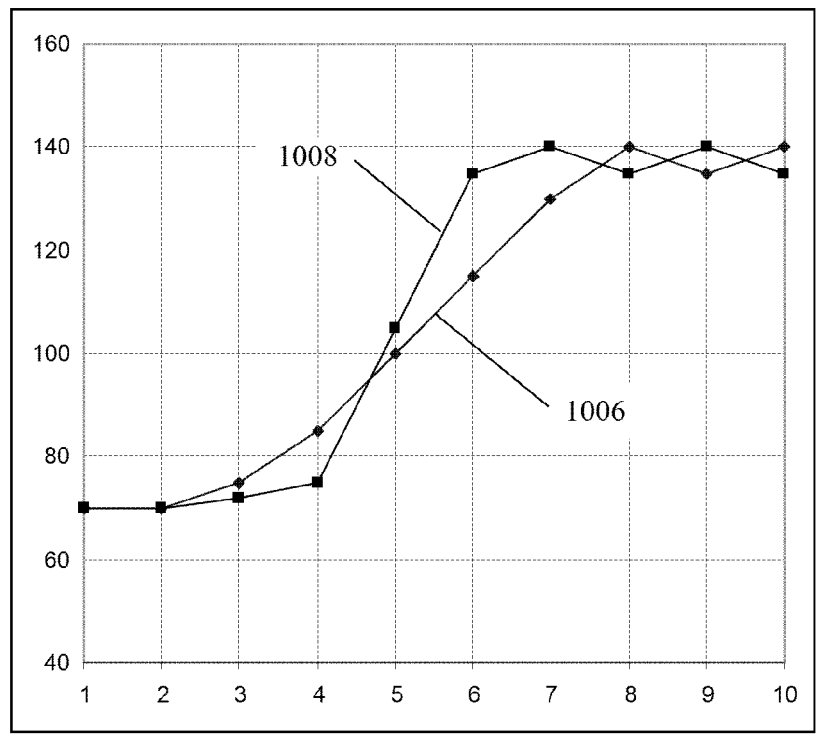
FIG. 10c is an illustration showing luminance value for a focused edge and an unfocused edge.

FIG. 10*c* illustrates a technique of using an edge transition width to produce focus feedback signal. Line 1006 is the image signal of a relatively unfocused image across the same edge. Line 1008 represents an image signal of a relatively sharp focused image across an edge. The signal values may be luminance of the image, or one of the chrominance channel. The horizontal axis is a pixel count from left to right. The vertical axis is the signal value. The less focused image signal 1008 takes approximately 5 pixels to make the transition from lower signal value on the left side to the higher signal values on the right side, beginning at pixel 3 and ending at pixel 7. The better focused image signal 1008 takes approximately 3 pixels to make the transition, from pixel 4 to 6. The transition width of the less focused image signal 1006 is 5, thus greater than the transition width of the better focused image signal 1008, which is 3.

Figure 10D:
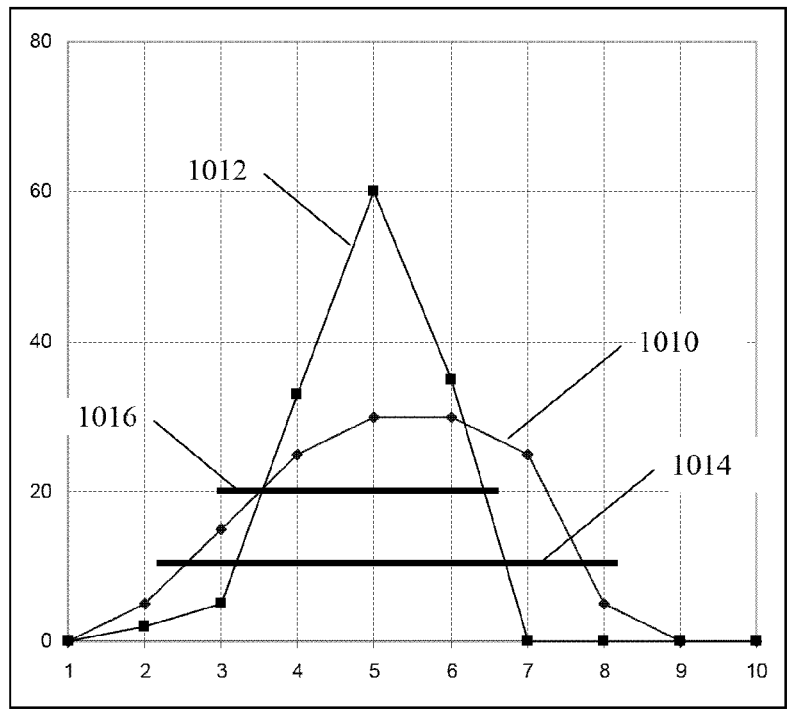
FIG. 10d is an illustration showing gradient values for a focused edge and an unfocused edge.

FIG. 10*d* illustrates the use of gradient plus the threshold on a fraction of the peak gradient in a neighborhood of pixels to calculate the transition width. Here the gradient is calculated by Sobel operator. For example, the gradient at pixel 5 is a signal value at pixel 7 minus signal value at 5. A different gradient calculation method may be used as long as it produces values proportional to the steepness of the transition slope. Line 1010 represents a gradient curve of the less focused image signal 1006. Line 1012 represents a gradient curve of the sharper focused image signal 1008. The peak value of the focused image is at 60, whereas the peak value of the less focused image is at a lower value of approximately 30. The gradient threshold is calculated at one third (⅓) of the peak value in the pixel neighborhood, in this case 60 for 1012 and 30 for 1010, respectively, producing 20 for 1012 and 10 for 1010, respectively. The gradient thresholds are shown as lines as 1014 and 1016, respectively. For the purpose of calculating edge transition width for 1008, contiguous pixels whose gradient values 1012 are above threshold 1016 are counted, giving 3. Likewise, the same procedures gives 5 for 1006.

Figure 11A:
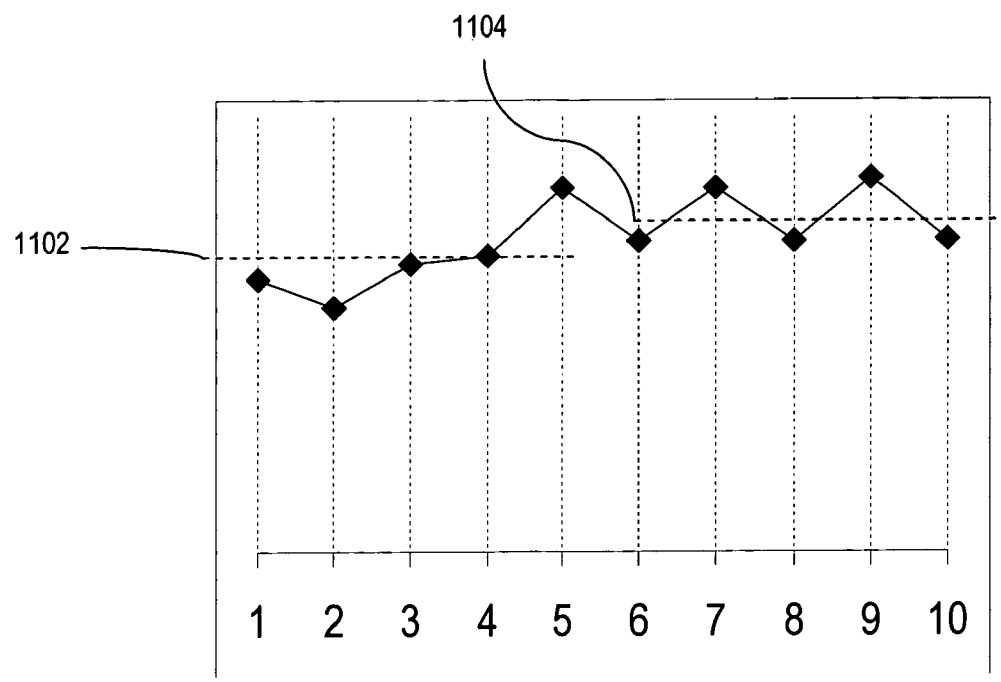
FIG. 11a is an illustration showing luminance values for pixels of an edge.
Figure 11B:
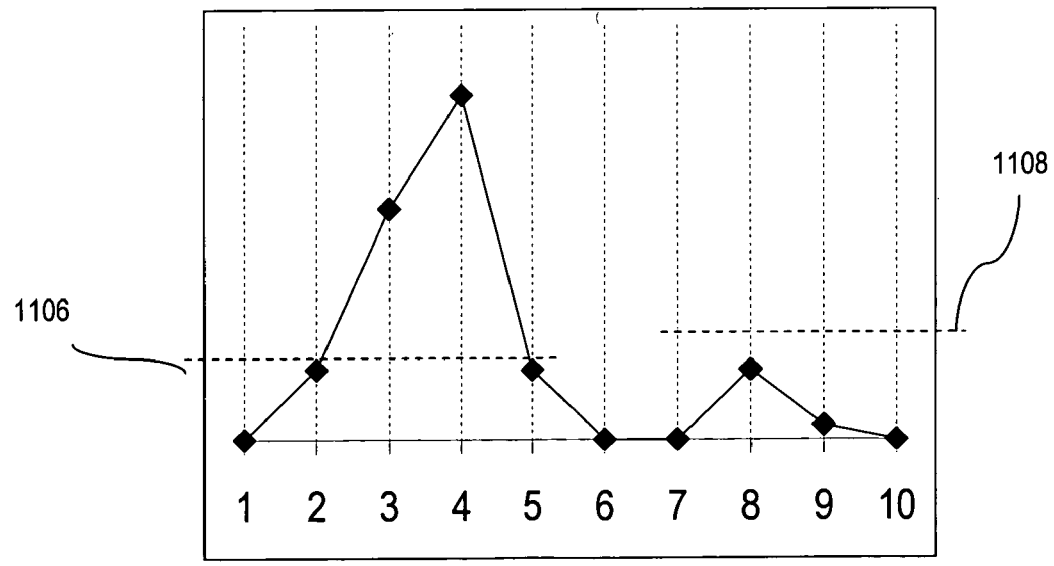
FIG. 11b is an illustration showing gradient values for pixels in a vicinity of an edge.

FIG. 11*a* shows luminance signal values for pixels of 2 consecutive edges and the means for a first edge 1102 and 1104 are shown. FIG. 11*b* illustrates the gradient magnitudes of the same pixels. A first edge starts at position 2 and ends at position 5. A second edge, with a much lower peak gradient, starts at position 8 and ends at position 9. Edge rejection threshold levels 1106 and 1108 for first and second edges, respectively, are found from the means shown in FIG. 11*a*. The peak gradient of the first edge occurs at position 4, and is well above the edge rejection threshold 1106, so the first edge 1102 is not rejected. The second edge, on the other hand, has a peak gradient at position 8 that is below the edge rejection threshold 1108, so the second edge 1104 is rejected. As an example, the edge rejection threshold may be 5% of the edge's luminance signal mean. In calculating the edge rejection threshold, the edge signal mean can be the mean across all pixels within the edge, or the mean at start and end positions, or any formulation that proportionately indicates the average signal level within the edge.

Figure 12:
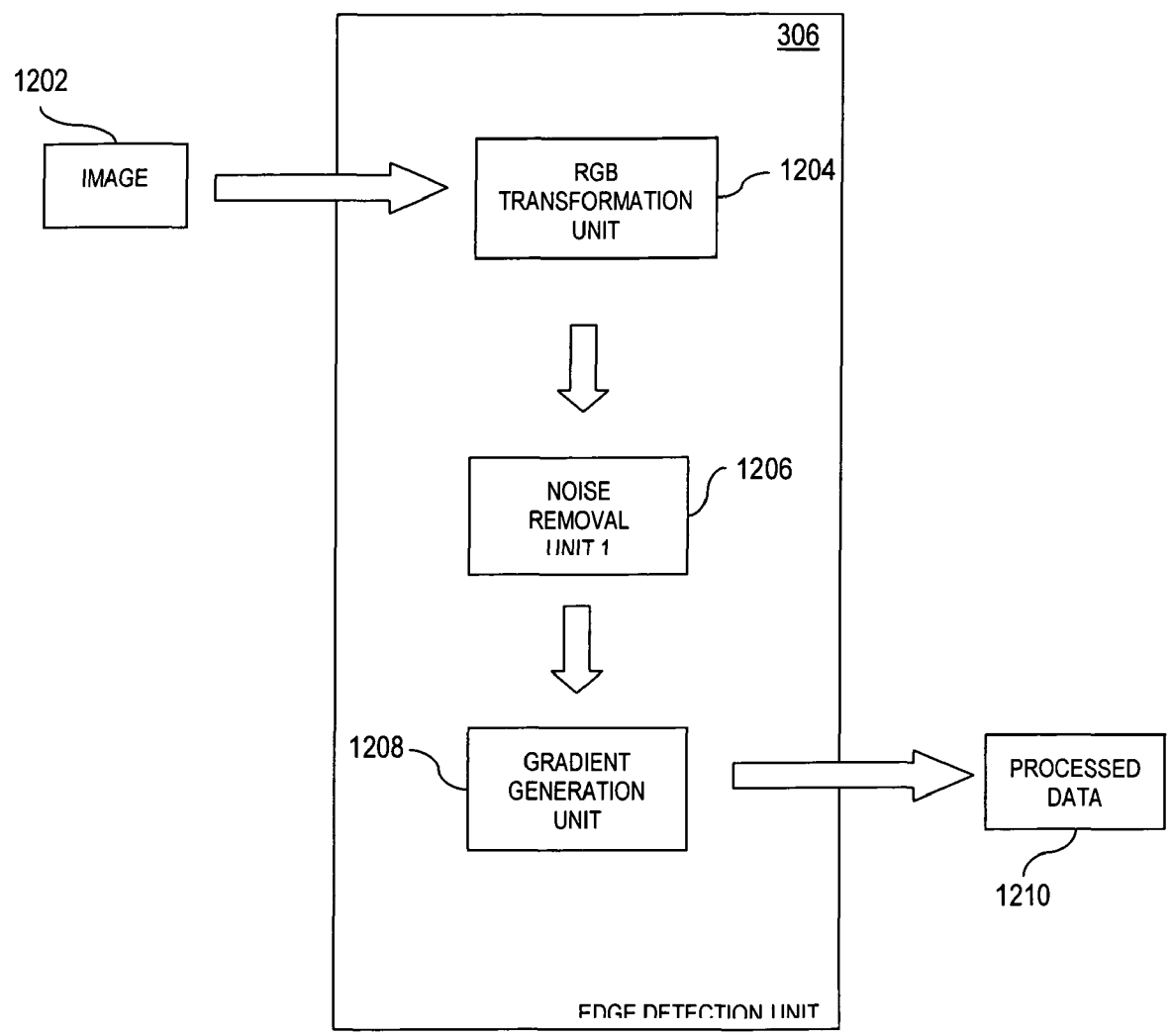
FIG. 12 is a schematic of an alternate embodiment of a controller.

FIG. 12 shows another embodiment of the edge detection unit 306 that receives an image 1202. The image is provided to an RGB transformation unit 1204, where the three signals of an image, red, green and blue are converted to a single signal. The signal can be generated by transforming the image to a grayscale image. Several techniques can be utilized to transform an image to a grayscale image. For example, RGB values can be used to calculate the luminance or chrominance value or a specific ratio of RGB values can be taken to form the grayscale image. For example, the luminance value can be calculated with the following equation:

$$Y=0.2126*R+0.7152*G+0.0722*B, \text{ where}$$
$$Y=\text{luminance value.}$$

The signal from the grayscale image is processed by the noise removal unit 1206, where a prior noise removal is performed on the image. The noise removal unit 1206 can be a low-pass filter or a Gaussian filter. The gradient of the processed image is then calculated by a gradient generation unit 1208. There are various methods available to calculate the gradient, including Laplacian, and Sobel. The calculated gradient represents the edges within the images and can be used to determine the sharpness of the image. The gradient generation unit 1208 provide processed data 1210.

Figure 13:
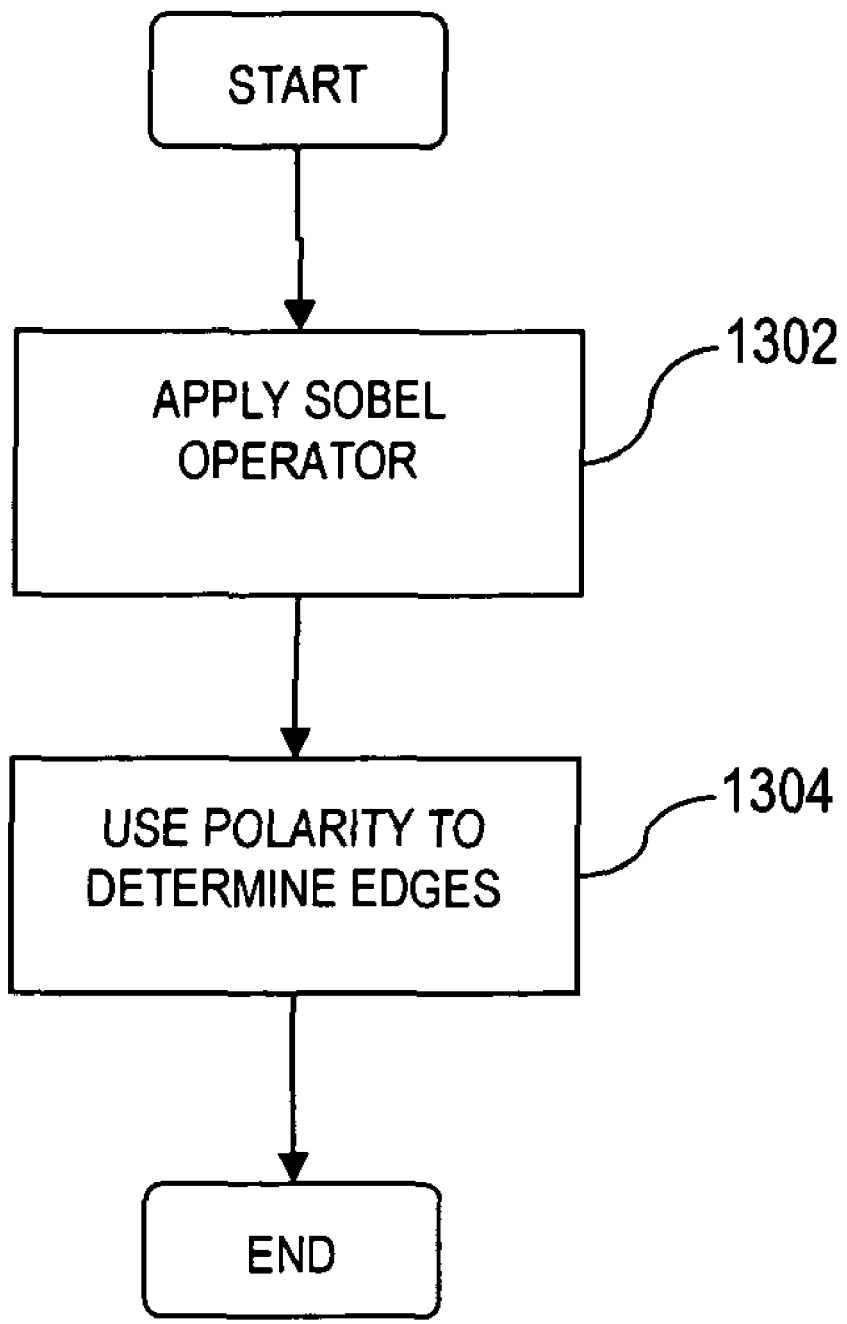
FIG. 13 is a flowchart showing a process to determine polarities of edges.

FIG. 13 is a flowchart of a process that can be performed by the gradient generation units 508 and 1208. In block 1302 the Sobel edge detection operator is applied on the image. The Sobel operator detects a change in the image based on the signal given to the operator. For example as described above, the image luminance, chrominance or simply a ratio between the red, green and blue values can be fed to the Sobel operator as signal G. The Sobel X-operator at pixel location [k, q] where k is row number and q is column number, is given by the equation $Sx[k, q]=G[k, q+1]-G[k, q-1]$. The Sobel Y-operator at the same location is given by the equation $Sy[k, q]=G[k+1,q]-G[k-1,q]$. In this embodiment, the Sobel operator detects a decreasing change in signal levels by denoting a negative gradient and an increasing change using a positive gradient. Depending on how the Sobel operator is applied, other denotations can be used to express the change in signal levels. In block 1304 the difference in polarity can be used to determine the edges and their respective widths.

Referring to FIG. 3, the width-measuring unit 308 receives edges identified by the edge detection unit 306. In one embodiment, the width measuring unit 308 receives the start and end positions of each edge, produced for example in steps 906 and 908 of FIG. 9, and further having passed through the noise removal unit 514 shown in FIG. 5. The width of the edge is the difference between the end and start positions plus 1.

As an illustration, consider FIG. 8e, which shows a vertical edge gradient map. Scanning horizontally from left to right, and sequentially from to the top row to bottom row, and considering all pixels whose gradient magnitude below 5 are rejected whereas those above are accepted, the first edge to be reported to width measuring unit 308 has a width of 3, starting at row R1, column C1, ending at row R1, column C3. The second edge has a width of 3, starting at row R2, column C2, and ending at row R2, column C4. The third edge has a width of 3, starting at row R3, column C3, and ending at row R3, column C5. The fourth and last edge has a width of 3, starting at row R4, column C4, and ending at row R4, column C6.

The horizontal edge gradient map in FIG. 8f is scanned similarly, except in transpose, namely scanning vertically down the column from top to bottom, and sequentially from the left column to the right column. Two edges are found, a first edge in column C5, with a width of 1, and a second edge in column C6, with a width of 2.

Figure 14:
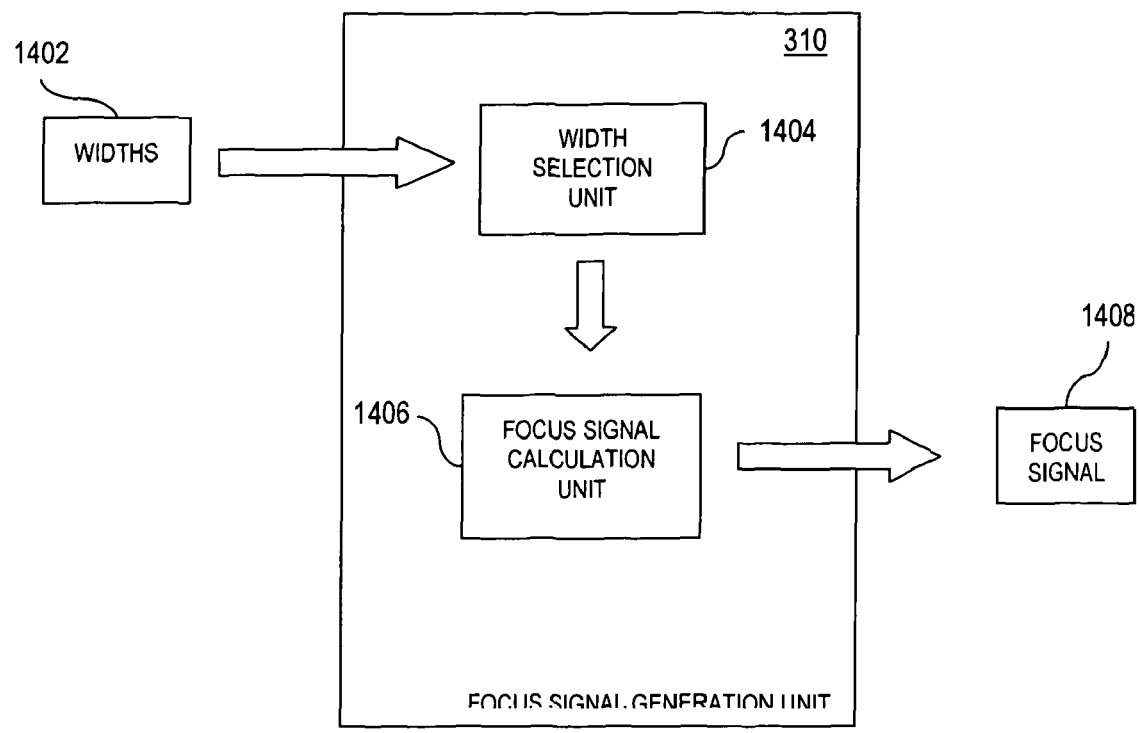
FIG. 14 is a schematic of an alternate embodiment of a controller.

FIG. 14 shows an embodiment of the focus signal generation unit 310. Widths 1402 from the width measuring unit 308 are used by the focus signal generation unit 310 to measure the sharpness of the image. Widths that fall outside predetermined thresholds will be discarded while the remaining edges will be selected in width selection unit 1404. A focus signal calculation unit 1406 generates a focus signal 1408 based on the selected edge widths. Alternatively, the average width of all the widths calculated by the width measuring unit 308 can be used as the focus signal 1408.

Figure 15:
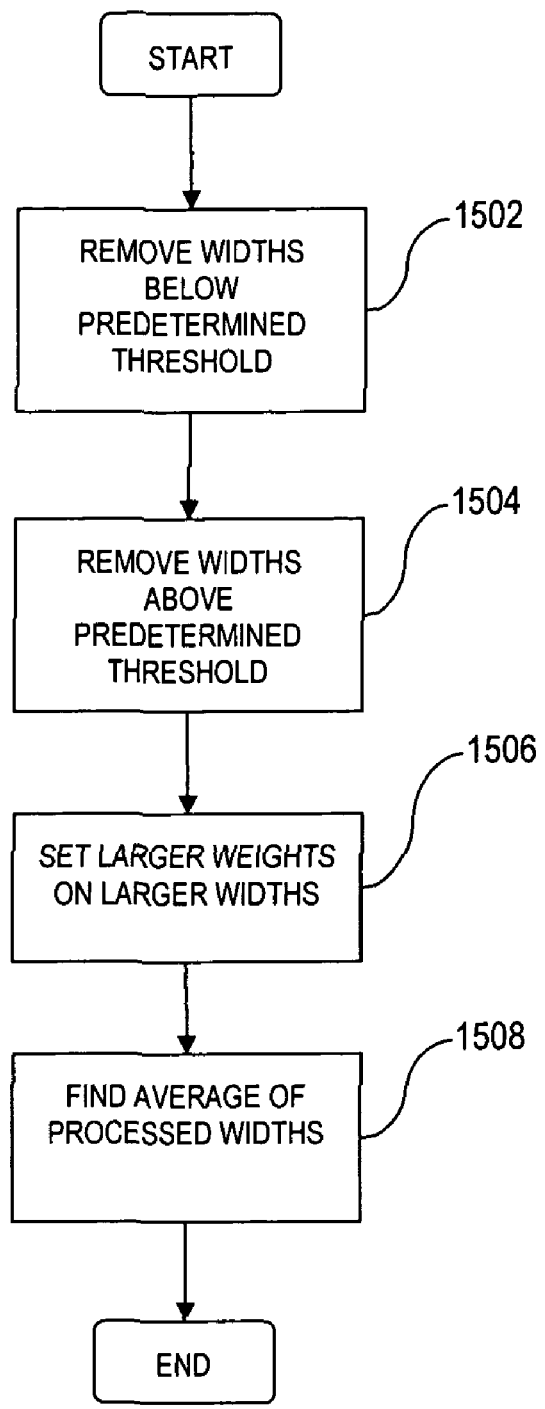
FIG. 15 is a flowchart showing a process to determine edge widths.

FIG. 15 is a flowchart showing a process to determine the average of the edge widths. Edge widths are discarded based on predetermined thresholds in blocks 1502 and 1504. In blocks 1506 and 1508, the focus signal can be calculated by taking the average of the remaining widths, or other manipulation of the data such as placing heavier weights on larger widths followed by taking the average.

Figure 16A:
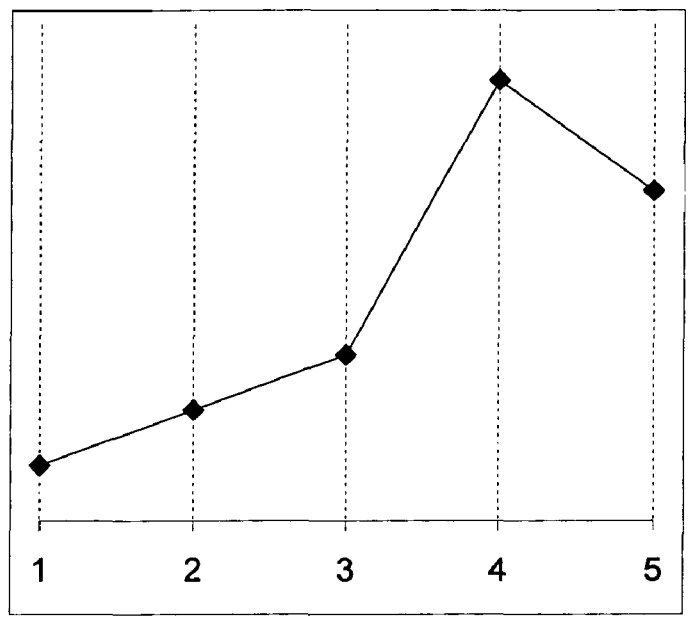
FIG. 16a is a histogram of edge widths for an unfocused image.
Figure 16B:
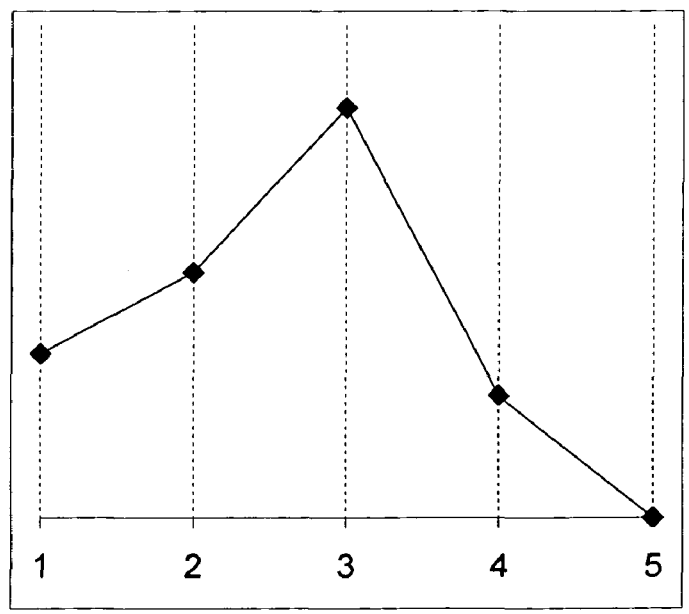
FIG. 16b is a histogram of edge widths for a focused image.

FIG. 16a and FIG. 16b show typical width distributions of a blurred image and a sharp image respectively. The x-axis denotes the width size, while the y-axis denotes the population of edges. Hence, it is observed that, blurred images have wider widths of around 4 to 5 pixels wide, while sharp images have smaller widths around 2 to 3 pixels wide. The relationship between the sharpness of an image versus the edge widths is the basis of the focus signal generated.

Figure 17A:
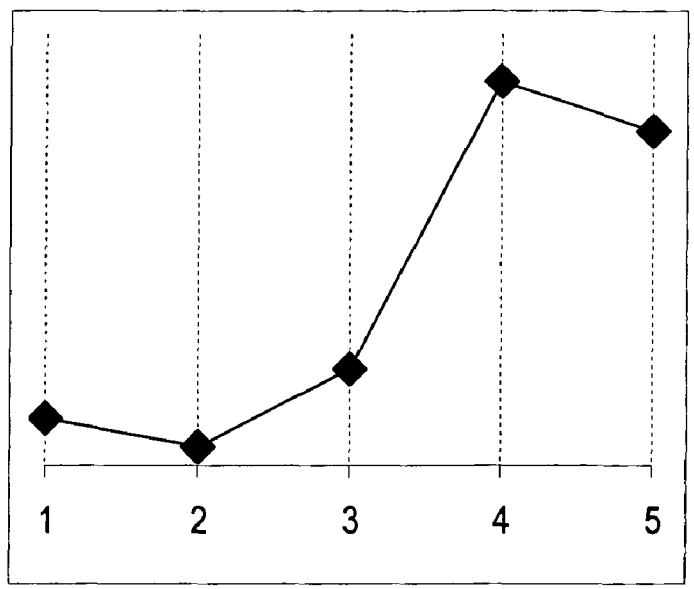
FIG. 17a is a histogram with weighted edge widths for an unfocused image.
Figure 17B:
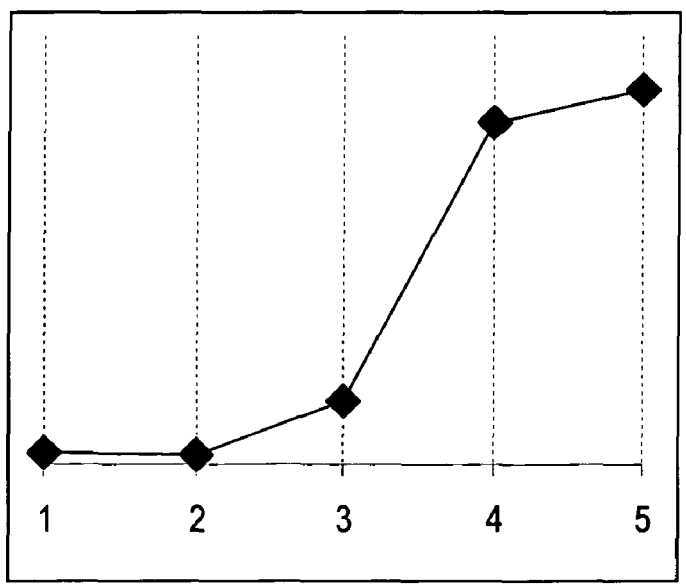
FIG. 17b is a histogram with weighted edge widths for a focused image.

The typical change of the histogram from a focused position like FIG. 16b to an unfocused position like FIG. 16a is such that the peak population number in the wider bins at the unfocused position is less than the peak population in the narrower bins at the focused position. This can be understood as follows. At the focused position, there are numerous narrow edges. These narrow edges may disappear at unfocused positions because their gradients fall below predetermined thresholds, or they merge together to form wider edges, which then are fewer in number. Empirically, the number of wide edges are inversely proportional to edge width. To counter this effect so that at an unfocused position the wider edge bins have similar counts to what narrower edge bins have at focused position, the population in each bin is multiplied by a different weight such that wider bins receive larger weights. FIG. 17a shows a width distribution of a blurred image prior to the application of weights, and FIG. 17b shows a width distribution after the application of weights. In this embodiment, for each width, the weight put on the population of edges is the width itself. For example, if there is a population of 10 edges at width 2, these 10 edges will be multiplied by 2 to obtain 20, a new population.

One advantage of the auto-focus controller is that the minimum focus signal, FEV of different images are at approximately the same values. This ensures that the lens will remain in the same position even if the camera is shaking but the image still remains sharp. Another advantage is that the range between the largest and smallest focus signal for a scene with different focal distances are wide enough to ensure that the optimum focus can be obtained.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for generating a focus signal from a plurality of edges of an image to indicate a degree of image sharpness, each edge among the plurality of edges making a contribution to the focus signal on basis of a width of said each edge, comprising:
excluding an image pixel from an edge among the plurality of edges by means of a device,
wherein a gradient having a magnitude smaller than a threshold is at the image pixel or between the image pixel and a peak gradient of the edge, the threshold being smaller than and proportional to the peak gradient.

2. The method of claim 1, wherein the threshold is a predetermined fraction of the peak gradient.

3. The method of claim 1, wherein the width is a count of pixels across said each edge.

4. The method of claim 1, wherein the gradient is generated from a first-order edge detection operator.

5. The method of claim 4, wherein the first-order edge detection operator is a Sobel edge detection operator.

6. A method for generating a focus signal from a plurality of edges of an image to indicate a degree of image sharpness, comprising:
making a contribution from each edge among the plurality of edges to the focus signal on basis of a width of said each edge by means of a device, wherein a first image pixel among a plurality of image pixels of a first edge among the plurality of edges, the plurality of image pixels being arrayed in a first direction, has a first gradient in the first direction and a second gradient in a second direction, the second gradient being larger than the first gradient but smaller than the first gradient plus a positive hysteresis value, the first direction being same as a preferred direction for the first image pixel.

7. The method of claim 6, wherein the preferred direction is an edge direction of a reference pixel for the first image pixel, the reference pixel having a largest gradient among image pixels adjacent to the first image pixel.

8. The method of claim 6, wherein either the first direction is a horizontal direction and the second direction is a vertical direction or the first direction is the vertical direction and the second direction is the horizontal direction.

9. The method of claim 6, wherein the width is a count of pixels across said each edge.

10. The method of claim 6, wherein the gradient is generated from a first-order edge detection operator.

11. The method of claim 10, wherein the first-order edge detection operator is a Sobel edge detection operator.

12. A method for generating a focus signal from a plurality of edges of an image to indicate a degree of image sharpness, each edge among the plurality of edges making a contribution to the focus signal on basis of a width of said each edge, comprising:

assigning different weights to contributions of the plurality of edges by means of a device, wherein said contribution from a first edge that has a larger width receives a first weight larger than a second weight received by said contribution from a second edge that has a smaller width, both the first and second edges being oriented in a same direction.

13. The method of claim 12, further comprising:
taking a weighted average of the contributions.

14. The method of claim 12, wherein the width is a count of pixels across said each edge.

15. The method of claim 12, wherein the gradient is generated from a first-order edge detection operator.

16. The method of claim 15, wherein the first-order edge detection operator is a Sobel edge detection operator.

17. A method for generating a focus signal from a plurality of edges of an image to indicate a degree of image sharpness, each edge making a contribution to the focus signal on basis of a width of said each edge, the focus signal being generated from a histogram having a plurality of bins that corresponds to different values of the width, said each edge being counted in a population of a bin that is selected from the plurality of bins of the histogram on basis of the width, comprising:

multiplying a first population of a first bin and a second population of a second bin with a larger weight and a smaller weight, respectively, wherein the first and second bins are among the plurality of bins and are respectively associated with a larger value and a smaller value of the width.

18. A method for generating a focus signal from a plurality of edges in an image to indicate a degree of image sharpness, each edge among the plurality of edges making a contribution to the focus signal on basis of a width of said each edge, comprising:

excluding a gradient from a sequence of gradients of an edge among the plurality of edges by means of a device, wherein the gradient has a magnitude smaller than a threshold, the threshold being smaller than and proportional to a peak gradient of the sequence.

19. The method of claim 18, wherein the threshold is a predetermined fraction of the peak gradient.

20. The method of claim 18, wherein the width is a count of the gradients that remain in the sequence after said excluding.

21. The method of claim 18, wherein the gradient is generated from a first-order edge detection operator.

22. The method of claim 21, wherein the first-order edge detection operator is a Sobel edge detection operator.

* * * * *